Jan. 15, 1924. 1,480,565
A. J. MOTTLAU
REVERSE PEDALING BALL CLUTCH COASTER BRAKE
Filed Feb. 17, 1922
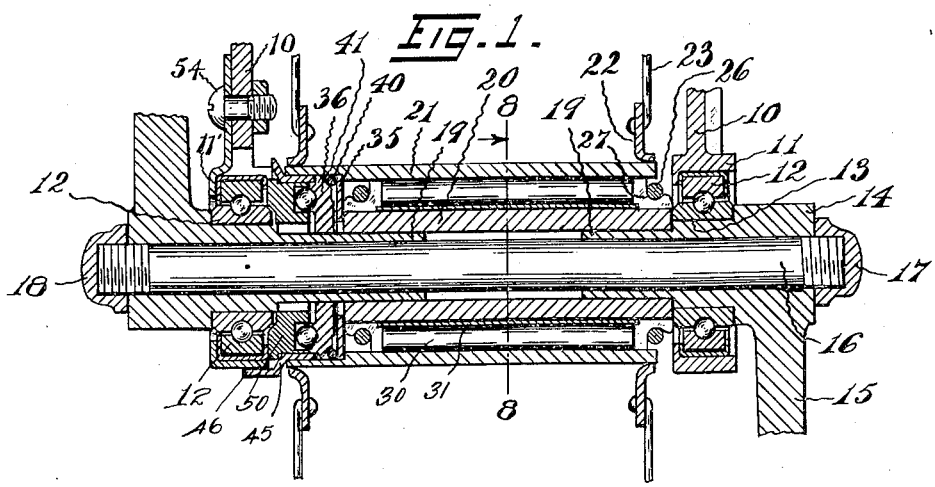
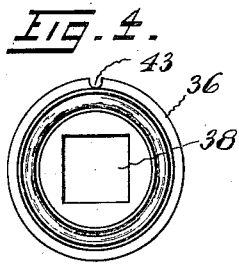
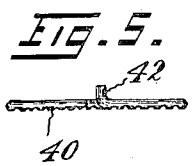
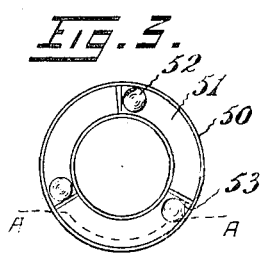
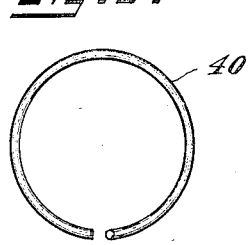
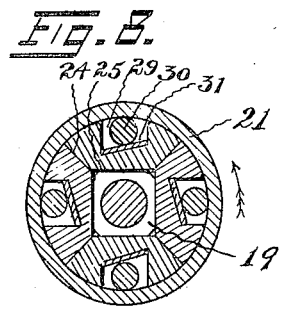
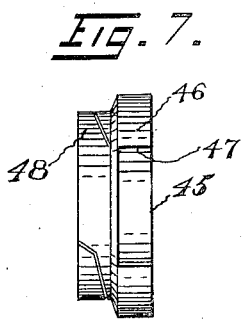
Witnesses:
Inventor:
August J. Mottlau,
By his Att'ys Patented Jan. 15, 1924.

1,480,565

UNITED STATES PATENT OFFICE.

AUGUST J. MOTTLAU, OF PHILADELPHIA, PENNSYLVANIA, ASSIGNOR TO A. MECKY COMPANY, OF PHILADELPHIA, PENNSYLVANIA, A CORPORATION OF PENNSYLVANIA.

REVERSE-PEDALING BALL-CLUTCH COASTER BRAKE.

Application filed February 17, 1922. Serial No. 537,293.

*To all whom it may concern:*

Be it known that I, AUGUST J. MOTTLAU, a subject of the King of Denmark, residing in Philadelphia, county of Philadelphia, and State of Pennsylvania, have invented certain new and useful Improvements in Reverse-Pedaling Ball-Clutch Coaster Brakes, of which the following is a specification.

This invention relates to coaster brakes for velocipedes though it is noted that the invention is not limited to velocipedes nor even in some respects to vehicles or brakes.

The invention relates particularly to improvements in the coaster brake shown in my U. S. Patent No. 1,398,883, issued Nov. 29, 1921.

In my said patent, I show, in combination with the bearings of the branches of the fork of the velocipede, cranks having tubular spindles journalled in said bearings and each formed with a squared portion receiving thereon a set of brake shoes mounted on polygonal portions of the spindles and outwardly actuated by said squared portions and provided with end grooves receiving annular split springs tending to retain said shoes in engagement with the spindles. The wheel hub encloses the brake shoes; and clutch-rollers disposed in longitudinal recesses of the brake shoes between the hub and the brake shoes serve for operatively connecting them, when the cranks are turned in forward direction.

In said patent forward pedaling causes the rollers to engage and clutch the hub to drive the velocipede forward. Reverse pedaling unclutches the rollers and lets the pedals turn freely backwards. When the pedals are at the same time pressed one forward and the other backward, the brake shoes engage the hub and put on the brake.

As above noted reverse pedaling causes the pedals to turn freely backward, thus preventing the rider from driving the velocipede backwards. It is this feature that the present invention has for its object to remove.

To this end my invention, briefly stated, is as follows: Frictionally placed in the end of the hub against a washer fast in the hub are a friction ring and an annular ball race caused to rotate with the crank spindle. Cooperating with this race is a stationary annular clutch member disposed in a clutch-member housing and provided with three separate inclined ball races. When the velocipede is driven forward, the balls are carried to the deep end of the inclined race, and holding the ball-clutch unclutched, and the rider may coast. When the rider back pedals, clutch balls move to the shallow end of the inclined races, forcing the annular race and the friction ring into frictional contact with said washer thus either braking the wheel or clutching it hard enough to permit the rider to back pedal.

Other objects of the invention will appear as the description proceeds; and while herein details of the invention are described, the invention is not limited to these, since many and various changes may be made without departing from the scope of the invention as claimed.

In the accompanying drawing, showing by way of example one of many possible embodiments of the invention, Fig. 1 is a longitudinal vertical section, viewed from the front, showing my invention as applied to the driving wheel of a velocipede;

Fig. 2 is an edge view partly in section of the clutch member;

Fig. 3 is an inner face view of the clutch member;

Fig. 4 is a side elevation of the annular ball race;

Figs. 5 and 6 are respectively edge and side elevations of the friction ring;

Fig. 7 is a front elevation of the clutch housing; and

Fig. 8 is a sectional view taken on the line 8—8 of Fig. 1.

The improved coaster brake is shown in combination with the prongs or branches 10 of the fork of a velocipede, said branches having annular end portions 11 and 11' in which are mounted ball bearings 12 for the reception of the cylindrical portions 13 of the tubular spindles 14, which have their outer ends integral with the pedal cranks 15. Said tubular spindles are connected and held in place by a bolt 16 extending longitudinally through them and through the cranks 15, said bolt having on its opposite ends nuts 17 and 18, although obviously it may be otherwise constructed.

The adjacent ends 19 of the crank spindles are externally squared and serve to support a convenient number of segmental brake shoes 20, in the present instance four, whose outer surfaces are cylindrically curved to fit within and substantially fill the cylindrical hub sleeve 21 of the velocipede wheel, of which only said sleeve 21, the end flanges 22 and parts of the spokes 23 are here shown.

In the present instance the shoes 20 have radially disposed engaging faces 24 (Fig. 8) and also flat faces 25 for engagement with the flat sides of the square ends 19 of the crank spindles. At each end of the shoes a spring ring 26 (Fig. 1) is disposed in an annular groove 27 formed in the brake shoes whereby all of the shoes are yieldably held together and caused to return to positions with their flat faces in engagement with the flat faces of the spindle ends 19 as shown in Fig. 8.

Each of the shoes 20 is preferably formed with a longitudinally extending recess 29 (Fig. 8) in its cylindrically curved face for the reception of a clutch roller 30, the bottom of each of these recesses, in the present instance being provided with a wear plate 31 on which the roller rests, and are inclined at an acute angle to the adjacent inner surface of the hub sleeve, so that when the shoes are turned in the forward direction all of the rollers are caused to frictionally engage with the hub sleeve with a wedging action.

The various parts are so assembled that the crank spindles are held from longitudinal movement on the bolt 16, but may be independently turned thereon to a limited extent. If the cranks 15 be turned forwardly, in a counterclockwise direction in Fig. 2, as indicated by the arrow, the shoes 20 on the squared ends 19 of the spindles 14 are turned with them and the rollers 30 engage with the sleeve 21 with a wedging action thereby to clutch said shoes to the hub sleeve 21. The sleeve 21 with the wheel attached thereto may thus be turned and the vehicle driven in a forward direction.

If the force applied to rotate the cranks 15 be removed, the shoes are held inward by the spring rings 26 and the wheel is free to turn forward independently of the cranks 15 and shoes 20, and such forward movement, while the cranks do not rotate will cause the rollers 30 to move into inoperative position at the deepest part of the recesses 29 and out of contact with the sleeve, thereby permitting the vehicle to coast. If now one of the pedals be angularly rotated relatively to the other, as would occur if the pedals were pressed in opposite direction or if one of them was held and the other pressed backwardly, there is a relative angular displacement of the squared ends 19 which forces outwardly the shoes 20 into frictional braking or retarding contact with the hubs sleeve 21. The forward rotation of the wheel, and forward motion of the vehicle are thus retarded; and this braking action may be stopped by again allowing the pedals and hence the shoes 20 to resume their normal positions under the action of the ring 26.

The structure and operation above described in detail is in a general way shown in my said patent.

Now will be described the clutch means whereby the vehicle may be driven backward.

A washer 35 disposed fast in and near one end of the sleeve 21 against one end of the brake shoes is frictionally engaged by an annular ball race 36 (Figs. 1 and 4) of the same contour all the way around and having a squared hole 38 received on one of said squared portions 19 whereby the race is rotated by the squared portion of the crank spindle. A roughened friction ring 40 (Figs. 1, 5 and 6) disposed between said washer and beveled periphery 41 of the race is provided with an out-turned end 22 engaging in a notch 43 of the periphery to prevent relative rotation of the ring and race.

A clutch-member housing 45 (Figs. 1 and 7) disposed in said sleeve 21 between said race 36 and the adjacent bearing 12 is provided with a flanged portion 46 embracing the annular portion 11' and provided with a cutout 47 for the reception of the fork 10 to prevent rotation of the housing. Said housing is provided with yieldable segmental side walls 48 for receiving a substantially stationary annular clutch member 50 (Figs. 1 to 3) disposed against the outer ring of the bearing 12 and cooperating with said annular race 36. The clutch member 50 is provided with three separate inclined races 51 increasing in depth toward the forward end 53 and carrying the balls disposed in all of said races 51 and in the annular race 36.

Herein the annular portion 11' is formed of sheet metal shaped for the reception of the bearing 12, and secured in place by the bolt 54; but it is particularly noted that other constructions may be used.

When the velocipede is driven forward, the annular race 36 turns forward carrying the balls to the forward or deep end of the substantially stationary inclined races 51 and holding the ball clutch-means unclutched. If the pedals are held stationary, the annular race is held stationary, the balls are still carried to the deep end of the races 51 and the ball clutch is still unclutched, and the rider may coast.

If, however, the rider back-pedals, either while moving forward or at rest, the annular ball race 36 turns backward, carrying the clutch balls backward, to the left in Fig. 2 and clockwise in Fig. 3 to the shallow end of the inclined races, thus pressing the annular race and the annular clutch member apart, and forcing the clutch member 45 against the outer ring of the bearing 12, and forcing the annular race 36 and the roughened ring 40 into firm frictional contact with the washer 35 thus either braking the wheel or finally clutching it firmly enough to permit the rider to drive the vehicle backward. During this action the bolt 16 prevents the forcing apart of the prongs 10 of the fork.

In the herein described form of my invention it is particularly to be noted that the various parts are of durable substantial construction, capable of being easily and quickly assembled, while the device as a whole may be made with a minimum cost. At the same time the construction is simple and certain in its action and little likely to get out of repair or require attention.

I claim:

1. In combination, a rotatable drive means; a driven sleeve member rotatable relative to the drive means when the latter is at rest; roller clutch means whereby the driven member is clutched to the drive means when the latter is rotated forwardly; and an additional means whereby the driven member is rotated backwardly.

2. In combination, a pair of bearings; cranks having spindles disposed in said bearings and formed with squared portions; relatively movable brake shoes mounted on said portions of the spindles; a sleeve enclosing said brake shoes; clutch rollers disposed between said shoes and sleeve for clutching the shoes to the sleeve when they are turned forwardly; and an additional means whereby the sleeve is rotated backwardly by the backward rotation of the spindles.

3. In combination, a rotatable drive means; a driven member rotatable relative to the drive means; means whereby the driven member is rotated forwardly; and an additional means comprising a plurality of parts, whereby the driven member is rotated backwardly by the axial relative movement of said parts.

4. In combination, a rotatable drive means; a driven member; clutch means whereby the driven member is turned forward by the drive means; and an additional clutch means whereby, when the drive means is rotated backwardly, the clutch-member and annular member are forced axially apart and the annular member is forced into clutching relation with the driven member.

5. In combination, a rotatable drive means; a driven sleeve member rotatable relative to the drive means; means whereby the driven member is rotated forwardly; and an additional means whereby the driven member is rotated backwardly by axial force exerted by said additional means.

6. In combination, a rotatable drive means; a driven member; clutch means whereby the driven member is turned forward by the drive means; an annular clutch member frictionally disposed against said driven member and rotatable by the drive means; a washer disposed fast in the driven member; an annular ball race frictionally disposed against said washer and rotatable by the drive means; a clutch-member in said sleeve cooperating with said race and provided with races increasing in depth toward the forward end; and balls disposed in all of said races whereby the clutch-member and ball races are forced apart when the drive members are rotated backwardly whereby the ball race is forced into braking and clutching engagement with the washer.

7. In combination, a pair of bearings; cranks having spindles disposed in said bearings and formed with squared portions; a bolt passing through said spindles to hold them against separating movement; clutch carrying members mounted on said portions of the spindles; a sleeve enclosing said carrying members; clutch means disposed between said carrying members and sleeve for clutching the carrying members to the sleeve when they are turned forward; a washer disposed fast near one end of the sleeve against one end of the carrying members between the carrying members and one of said bearings; an annular ball race frictionally disposed against said washer and having a squared hole received on one of said squared portions whereby the race is rotated by the squared portion of the crank spindle; said race having a notched beveled periphery at its inner face; a friction ring disposed between said periphery and having an end engaging in the notch of the periphery; a clutch-member disposed in said sleeve against said bearing and cooperating with said race and provided with three separate inclined races increasing in depth toward the forward end; and balls disposed in all of said races.

8. In combination, a rotatable drive means; a driven sleeve member rotatable relative to the drive means; a washer disposed fast near one end of the driven member; an annular member frictionally disposed against said washer and rotated by the drive means and having a notched beveled periphery at its inner face; a friction ring disposed between said periphery and washer and having an out-turned end engaging in the notch of the periphery; and a clutch-member cooperating with said annular member, whereby, when the driven means and annular member are rotated backwardly, the ring and annular member are forced into gradual frictional braking and clutching engagement with the washer.

9. In combination, a rotatable drive means; a driven member; roller clutch means whereby the driven member is turned forward by the drive means; an annular clutch member frictionally disposed against said driven member and rotatable by the drive means; and an additional clutch-member cooperating with said annular member whereby, when the drive means is rotated backwardly, the clutch-member and annular member are forced axially apart and the annular member is forced into gradual frictional clutching engagement with the driven member.

10. In combination, driving means adapted for movement in either direction; clutch carrying members rotatable by the driving means; a driven member enclosing said carrying member; roller clutch means for clutching the carrying members to the driven member when the driving means is turned forward; and additional clutch means for gradually clutching the driving means to the driven member when the driven means rotates rearwardly.

11. In combination, driving members adapted for concurrent movement, relative movement or rest; brake members movable to braking action by relative movement of said driving members; a driven member enclosing said brake members; and clutch means for gradually clutching the driving members to the driven member when the driven member rotates rearwardly.

12. In combination, driving members adapted for concurrent movement in either direction, relative movement or rest; brake members movable to braking action by relative movement of said driving members, and rotatable by concurrent movement of the driving members; a driven member enclosing said brake members; clutch means for clutching the brake members to the driven member when the driving members are turned forward; and additional clutch means for gradually clutching the driving members to the driven member when the driven member rotates rearwardly.

13. In combination, co-axial bearings; a pair of driving members therein; brake members movable to braking action by relative movement of said driving members, and rotatable by concurrent movement of the driving members; a driven sleeve enclosing said brake members; clutch means for clutching the brake members to the driven sleeve when the driving members are turned forward; a washer disposed fast near one end of the sleeve against one end of the brake members; an annular ball race of the same contour all the way around frictionally disposed against said washer and rotatable by the adjacent drive member, and having a notched beveled periphery at its inner face; a friction ring between said washer and periphery and having an out-turned end engaging in the notch of the periphery; a clutch-member disposed in said sleeve between said race and the adjacent bearing and disposed against said bearing and cooperating with said race and is provided with three separate inclined races increasing in depth toward the forward end; and balls disposed in all of said races.

14. In combination, a pair of spaced bearings; spindles in said bearings having squared portions; relatively movable brake shoes mounted on said portions; a sleeve enclosing said brake shoes; means for clutching the shoes to the sleeve when the shoes are turned in forward direction; a washer fast in an end of the sleeve against the brake shoes; an annular ball race frictionally disposed against said washer and having a squared hole received on one of said squared portions; and a notched beveled periphery at its inner face; a friction ring between said periphery and washer having an end engaging in said notch; a clutch means in said sleeve between said race and the adjacent bearing and cooperating with said race and provided with inclined races increasing in depth toward the forward end; and balls disposed in said races.

15. In combination, a drive means; a driven member movable relative to the drive means; and means actuated by backward movement of the drive means, for bringing the drive means and the driven means into gradual braking relation.

16. In combination, a rotatable drive means; a driven member rotatable relative to the drive means; and means for automatically initiating, by backward rotation of the drive means, the bringing of the drive means into gradual braking and then full clutching relation with the driven means.

17. In combination, a rotatable drive means; a driven member rotatable relative to the drive means; and means coacting with the drive means, independently of the action of the driven member for bringing the drive into clutching relation with the driven means.

18. In combination, a rotatable drive means; a driven member rotatable relative to the drive means; and means including non-rotatable and movable parts coacting with each other and the drive means for automatically, on backward rotation of the drive means, bringing the drive means and the driven means into gradual clutching relation.

19. In combination, a rotatable drive means; a driven member rotatable relative to the drive means; and means including relatively fixed and movable parts coacting with each other and the drive means, independently of the action of the driven member for automatically, on backward rotation of the drive means, bringing the drive means and the driven means into gradual braking and then full clutching relation with the driven means.

AUGUST J. MOTTLAU.

Witnesses:
ALBERT E. PARKER,
WM. H. WICHMAN.